Oct. 26, 1937.   R. R. R. SARAZIN   2,096,999
ELASTIC COUPLING DEVICE
Filed May 13, 1937

Inventor:
Raoul Roland Raymond Sarazin,

Attorneys

Patented Oct. 26, 1937

2,096,999

UNITED STATES PATENT OFFICE 2,096,999

ELASTIC COUPLING DEVICE

Raoul Roland Raymond Sarazin, St.-Prix, France

Application May 13, 1937, Serial No. 142,522
In Luxemburg February 27, 1937

9 Claims. (Cl. 64—24)

The present invention relates to elastic coupling devices of the kind in which the elements to be coupled together, such for instance as a driving shaft and a driven shaft, are connected to each other through oscillating bodies rigid with swinging elements arranged in such manner that they tend to assume, for instance under the effect of the accelerations produced by the movements of said elements, a position of equilibrium on either side of which said swinging elements can be given angular displacements.

The invention is more especially, although not exclusively, concerned with devices of this kind intended to be interposed between an engine and an aircraft propeller.

The object of the present invention is to provide a device of this kind which is better adapted to meet the requirements of practice than other devices for the same purpose used up to the present time.

The essential feature of the present invention consists, in the construction of a device of the kind above mentioned, in addition to interposing between the elements, generally shafts, to be coupled together an oscillating body subjected to the action of a swinging piece, in making this swinging piece of at least two parts, one of which is rigid with said oscillating body and the other one is connected to the first one in such manner as to be able to oscillate itself with respect to said first one.

Another feature of the present invention consists in giving said second mentioned part of the swinging piece the form of a bifilar pendulum.

Other features of the present invention will result from the following detailed description of some specific embodiments thereof.

A preferred embodiment of the present invention will be hereinafter described, with reference to the accompanying drawing, given merely by way of example, and in which.

Figure 1:
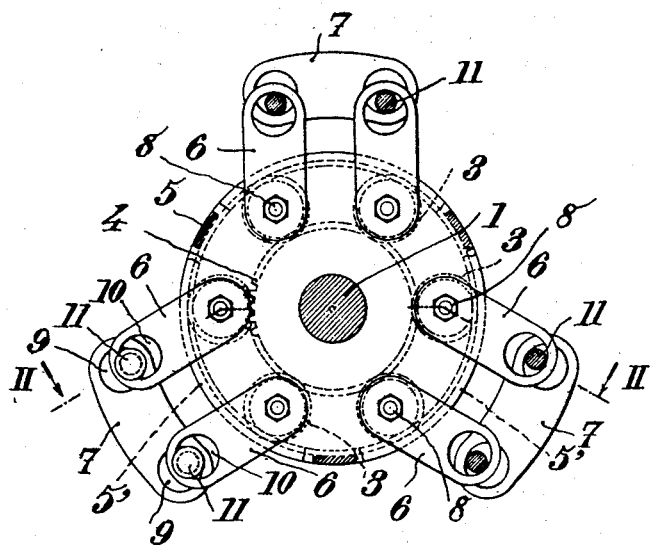
Fig. 1 is an end view, with parts cut away, of an elastic coupling device made according to the invention.
Figure 2:
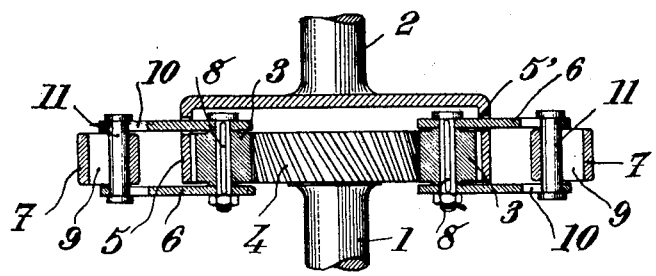
Fig. 2 is a sectional view on the line 2—2 of Fig. 1.

In the following description of an embodiment of the invention, given merely by way of example, it will be assumed that it is desired to provide an elastic coupling device between the crankshaft 1 of an airplane engine and the propeller carrying shaft 2 disposed in line with said crankshaft, said device being of the kind above referred to.

I provide roller tracks in elements rigid respectively with the driving shaft 1 and the driven shaft 2, and between these roller tracks I mount at least one oscillating body, and, preferably, a plurality of these bodies.

These oscillating bodies may for instance consist of pinions 3 distributed at equal angular intervals about the common axis of shafts 1 and 2. In this case, the roller tracks above referred to consist respectively of a toothed wheel 4 rigid with shaft 1 and an annular member 5, provided with internal teeth, carried by shaft 2.

The oscillating pinions 3 are subjected to the action of swinging elements or pieces devised in such manner that, under the effect of the centrifugal force, they tend constantly to bring back said pinions into a position of equilibrium and thus to oppose in an elastic manner angular displacements of shafts 1 and 2.

According to the essential feature of the present invention, these swinging elements are made of at least two parts, one of which, to wit 6, is rigid angularly with the corresponding pinion 5, whereas the other one, to wit 7, which is preferably given a preponderating mass, is connected to part 6 in such manner as to be itself capable of oscillating with respect thereto.

Such an elastic coupling device will absorb, at least most of the torsional vibrations which tend to occur between the driving shaft 1 and the driven shaft 2 for instance as a consequence of the fact that the resisting torque acting on said driven shaft 2 will be substantially uniform whereas the driving torque transmitted by shaft 1 undergoes periodical variations due chiefly to the discontinuous impulses of the pistons and to the inertia forces acting on the movable parts of the engine.

As a matter of fact, it will be understood that every time the driving shaft 1 moves forward or rearward with respect to shaft 2, that is to say every time torsional vibrations take place, pinions 3 are caused to roll in their tracks, which produces an angular displacement of parts 5 of the balancing swinging elements, to which angular displacement the movable part 7 of said swinging elements will oppose itself as a consequence of its inertia. It follows that said movable part 7 is given an oscillating movement the effects of which on parts 6 are in opposition with those resulting from the action of shaft 1 on said parts 6. Accordingly, a vibration absorbing operation takes place, which permits the whole of the swinging element to come back into the intermediate position toward which it is always urged by the centrifugal force.

It will be readily understood that, in such a coupling device, the absorbing element is constituted by the system of masses 7 movable with respect to parts 6, to which the torsional vibrations are transmitted through pinions 3.

Of course, this absorbing element may be devised in many different manners, but it seems preferable to arrange it in such manner that masses 7 constitute respective bifilar pendulums adapted to undergo, with respect to parts 6, oscillatory displacements of high frequency.

For instance, as shown by the drawing, a mass 7 is provided for two parts 6, and each of these parts 6 consists of a pair of arms or flanges fixed through their inner ends, for instance by means of a pin 8 keyed thereon, to the corresponding pinion 3. The front arms extend through annular member 5 owing to the provision of slots 5' provided for this purpose in said annular member.

Said mass 7 is connected to the free ends of a pair of arms 6 through means such as those described in my French Patent No. 783,734. According to the embodiment illustrated by the drawing, these means are constituted by providing, at either end of mass 7, an aperture 9, by providing an orifice 10 in each of the arms to be connected with said mass 7, and by engaging in these apertures disposed in line with one another, which constitute roller tracks, a rolling body 11 adapted to engage therein with a substantial play, for instance of some millimeters for a rolling body constituted by a pin of a diameter of 10 millimeters.

Concerning now the shape and the size of the apertures 9 and 10, I may advantageously have recourse to any of the solutions set forth in the above mentioned French patent. For instance, according to a very simple arrangement, they may consist of circular holes of the same radius.

Whatever be the specific arrangement which is chosen, the elastic coupling device according to the present invention has for its chief advantage to automatically absorb the torsional vibrations which may take place between shafts 1 and 2.

Of course, the embodiment above described has been given merely by way of example and the movement of the elements to be coupled together might be different from a rotary movement, consisting for instance of a rectilinear movement and the vibrations to be absorbed being longitudinal vibrations.

In a general manner, while I have, in the above description, disclosed what I deem to be practical and efficient embodiments of the present invention, it should be well understood that I do not wish to be limited thereto as there might be changes made in the arrangement, disposition, and form of the parts without departing from the principle of the present invention as comprehended within the scope of the appended claims.

What I claim is:

1. A coupling device for use between two elements movable with respect to each other, which comprises, in combination, at least one oscillating body arranged to cooperate with both of said elements simultaneously, and a swinging system associated with said body, including a part rigid with said oscillating body and at least another part connected with said first mentioned part in an oscillating manner.

2. A coupling device for use between two elements movable with respect to each other, which comprises, in combination, at least two oscillating bodies operatively connected with both of said elements simultaneously, and a swinging system associated with both of these bodies, including two parts rigid with said bodies simultaneously, and a mass movably connected with both of said parts so as to constitute with them a bifilar pendulum.

3. A coupling device for use between two elements rotatable about a common axis, which comprises, in combination, at least one oscillating body arranged to roll on both of said elements simultaneously, and a swinging system associated with said body, including a part rigid with said oscillating body and at least another part connected with said first mentioned part in an oscillating manner.

4. A coupling device for use between two elements rotatable about a common axis, which comprises, in combination, coaxial rolling tracks formed in said elements, respectively, at least one rolling body adapted to cooperate with both of said tracks simultaneously, and a swinging system associated with said body, including an arm rigid with said rolling body, and a mass connected to said arm in an oscillating manner.

5. A coupling device for use between two elements rotatable about a common axis, which comprises, in combination, coaxial rolling tracks formed in said elements, respectively, at least two rolling bodies adapted to cooperate each with both of said tracks simultaneously, and a swinging system associated with said bodies, including an arm rigid with each of said bodies, and a mass movably connected with both of said arms in such manner as to constitute with them a bifilar pendulum.

6. A coupling device for use between two elements rotatable about a common axis, which comprises, in combination, a toothed wheel rigid with one of said elements, an annular member rigid with the other element surrounding said toothed wheel coaxially therewith and provided with internal teeth, at least one couple of pinions adapted to mesh simultaneously with said toothed wheel and said annular member, and a swinging system associated with said couple of pinions, including an arm rigid with each of said pinions, and a mass movably connected with both of said arms in such manner as to constitute with them a bifilar pendulum.

7. A coupling device for use between two elements rotatable about a common axis, which comprises, in combination, coaxial rolling tracks formed in said elements, respectively, a couple of rolling bodies adapted to cooperate each with both of said tracks simultaneously, and a swinging system associated with said couple of bodies, including an arm rigid with each of said bodies simultaneously, extending normally radially in the outward direction, each arm being provided with an aperture at its outer end, a mass provided with an aperture at either end, and two pins connecting said mass with said arms respectively, each of said pins engaging with a certain play in the aperture of one of said arms and one aperture of said mass.

8. A coupling device according to claim 7 in which the apertures in said arms and said mass are circular.

9. A coupling device according to claim 7 in which the weight of said mass is greater than that of said couple of arms.

RAOUL ROLAND RAYMOND SARAZIN.